United States Patent
Verma et al.

(10) Patent No.: US 12,263,410 B2
(45) Date of Patent: *Apr. 1, 2025

(54) GAME PERFORMANCE PREDICTION FROM REAL-WORLD PERFORMANCE DATA

(71) Applicant: Microsoft Technology Licensing, LLC, Redmond, WA (US)

(72) Inventors: Arunabh Verma, Seattle, WA (US); Rajneil Singh Rana, Kirkland, WA (US); Seyed Ali Hosseini Khayat, Kirkland, WA (US); Matthew Carl Dubois, Woodinville, WA (US); Daniel Aaron Dobyns, Snoqualmie, WA (US); Sebastian Carl Merry, Redmond, WA (US); Griffin Solimini, Seattle, WA (US); Shu-Wei Hsu, Redmond, WA (US); William Jarrad Bailey, Mercer Island, WA (US); Timothy John Kiesow, Duvall, WA (US); Eric Hamilton, Bothell, WA (US); Kripal Kavi, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/490,117

(22) Filed: Oct. 19, 2023

(65) Prior Publication Data

US 2024/0042330 A1    Feb. 8, 2024

Related U.S. Application Data

(63) Continuation of application No. 17/690,216, filed on Mar. 9, 2022, now Pat. No. 11,826,657.

(Continued)

(51) Int. Cl.
*A63F 13/77*    (2014.01)
*A63F 13/335*   (2014.01)
*G06N 3/10*     (2006.01)

(52) U.S. Cl.
CPC ............ *A63F 13/77* (2014.09); *A63F 13/335* (2014.09); *G06N 3/10* (2013.01); *A63F 2300/535* (2013.01)

(58) Field of Classification Search
None
See application file for complete search history.

(56) References Cited

U.S. PATENT DOCUMENTS 9,111,219 B1 *   8/2015   Mohla ..................... G06N 5/04
11,358,062 B2 *  6/2022   Pichaimurthy ....... A63F 13/533
(Continued)

*Primary Examiner* — Jay Trent Liddle

(57) ABSTRACT

In non-limiting examples of the present disclosure, systems, methods, and devices for matching device configurations to games are presented. A set of device configuration tiers may be generated from gameplay telemetry data generated by a plurality of client devices executing a plurality of games. A device configuration for a specific client device may be determined based at least on the specific client device's GUI type. When the specific client device accesses a software game library a determination may be made based on a performance tier corresponding to the device configuration for the specific client device as to whether the specific client device can adequately execute each game. One or more recommendations may be rendered and displayed in the game library based on the determination of whether the specific client device can adequately execute each game.

20 Claims, 9 Drawing Sheets

Related U.S. Application Data

(60) Provisional application No. 63/278,395, filed on Nov. 11, 2021.

(56) References Cited

U.S. PATENT DOCUMENTS

| | | | |
|---|---|---|---|
| 2019/0370139 A1* | 12/2019 | Vichare | G06F 9/44505 |
| 2019/0391898 A1* | 12/2019 | Vichare | G06F 9/44505 |
| 2022/0347583 A1* | 11/2022 | He | G06N 20/00 |
| 2022/0395754 A1* | 12/2022 | Ballard | A63F 13/42 |

* cited by examiner

GAME PERFORMANCE PREDICTION FROM REAL-WORLD PERFORMANCE DATA

CROSS REFERENCE TO RELATED APPLICATIONS

This application is a continuation of and claims priority to and the benefit of U.S. patent application Ser. No. 17/690,216, filed Mar. 9, 2022, titled "GAME PERFORMANCE PREDICTION FROM REAL-WORLD PERFORMANCE DATA," which claims priority to and the benefit of U.S. Provisional Patent Application No. 63/278,395, filed Nov. 11, 2021, titled "GAME PERFORMANCE PREDICTION FROM REAL-WORLD PERFORMANCE DATA," each of which are incorporated herein by reference in their entireties for all purposes.

BACKGROUND

Users may access and play videogames from a variety of device types. For users that play games on personal computers (PCs) it is often difficult to determine which games are likely to play well (e.g., acceptable frame rate) on their devices. This is due to the variety of hardware configurations that are available on PCs, in addition to the various suggested or required configurations associated with different games. Thus, gamers have many games that they can choose from, but no good way of knowing—without actually downloading and trying—which games are well suited to their PCs.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods, and devices for matching device configurations to games. A gameplay performance service may receive gameplay telemetry data from a plurality of client devices. The gameplay telemetry data may comprise performance data (e.g., frame rate data, display resolution data), device configuration data (e.g., GPU type, CPU type), and game identity data. The gameplay performance service may associate each device configuration with a performance tier based on processing of the performance data. For example, the gameplay performance service may determine average frame rates for each device configuration across a plurality of games and assign the device configurations to performance tiers based on those determinations.

The gameplay performance service and/or developers may determine and associate gameplay performance thresholds with each game included in a game library. A determination may then be made as to which device configurations are needed to meet the determined gameplay performance thresholds for a game. From those determinations, the gameplay service may identify performance tiers that meet each of the gameplay performance thresholds for a game and store that data in a database as performance fit data. When a client device accesses the game library, a determination may be made as to the client device's device configuration. The gameplay performance service may match the device's configuration to a performance tier and make recommendations, provide insights, and/or cause actions to be performed based on the performance tier of the device in relation to gameplay performance thresholds associated with games in the game library.

BRIEF DESCRIPTION OF THE DRAWINGS

Non-limiting and non-exhaustive examples are described with reference to the following figures.

DETAILED DESCRIPTION

Figure 1:
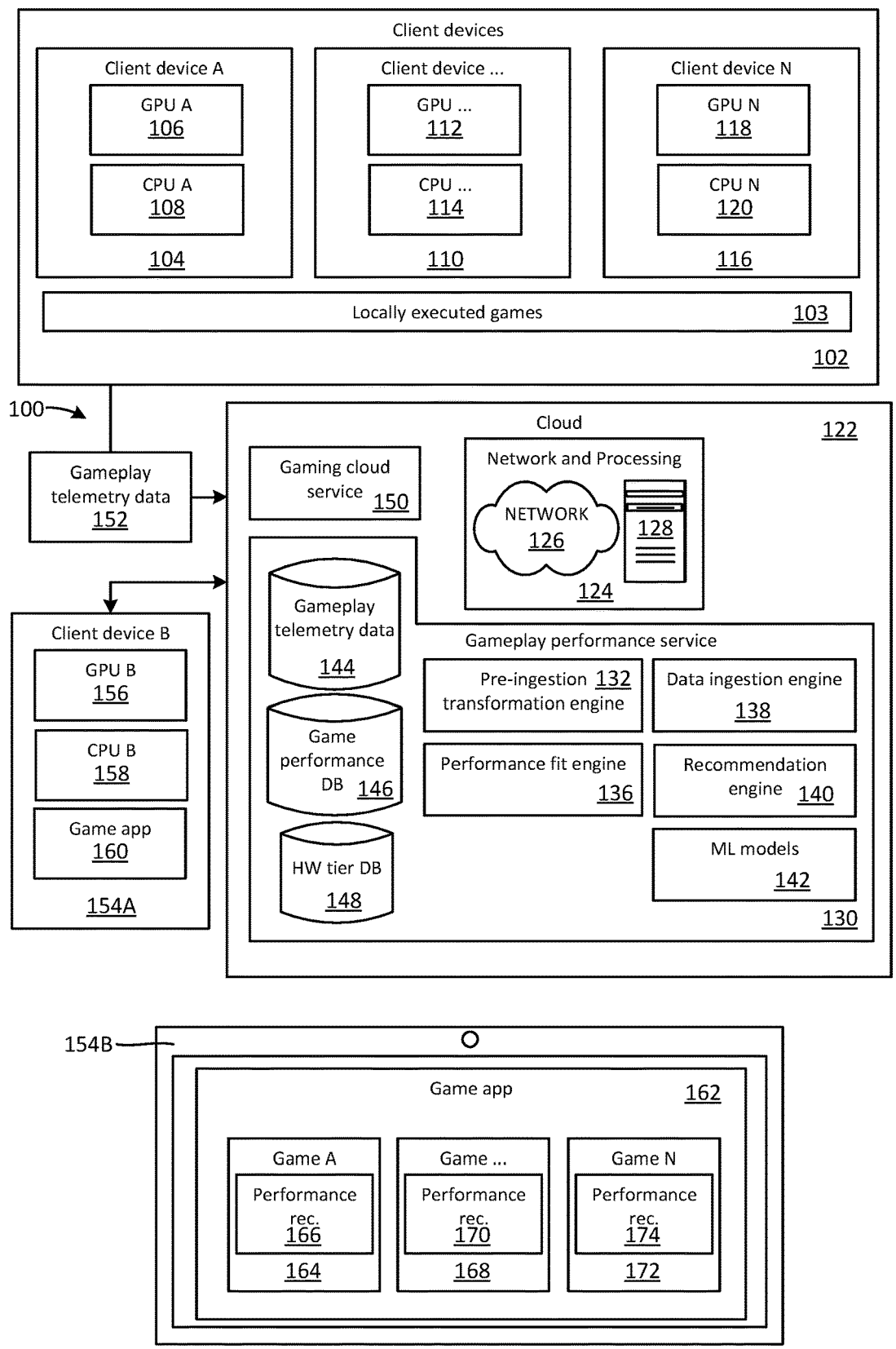
FIG. 1 is a schematic diagram illustrating an example distributed computing environment for matching device configurations to games.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A large issue that PC gamers frequently face is effectively determining which games will play well on their machines. This issue is even more pronounced when game platforms that provide access to many different games are involved. Given the large matrix of PC hardware that is available, game publisher-provided hardware requirements are often incomplete or inconsistent, and therefore do not serve as a reliable mechanism for predicting game performance on specific hardware configurations. Thus, aspects of the current disclosure provide accurate, reliable, and scalable mechanisms by which users can easily understand whether games will play well on their devices, reducing frustration and enriching the overall user experience. Examples of the current disclosure provide a scalable system that leverages real-world game performance data from many (e.g., hundreds, thousands, millions) of PC gamer devices, to generate reliable and consistent predictions for gamers evaluating the performance fit for games on their hardware. These systems can be leveraged to enable delightful client experiences, including tailored user interfaces (UIs), PC architecture (e.g., x64, ARM), and hardware-specific recommendations for gaming, among other technical advantages described herein.

Non-limiting examples of the present disclosure describe systems, methods, and devices for matching device configurations to games so that recommendations and insights can be surfaced to assist users in determining which games to play on their devices, how to best execute games that may not be best suited on a current device and automate device actions that may make improve gameplay experiences. A gameplay performance service may be provided with gameplay telemetry data from a plurality (e.g., hundreds, thousands, millions) of client devices (e.g., PC devices, tablet devices) that are executing games accessed from a game library associated with a gaming cloud service. The telemetry data may be automatically scrubbed for personal identifiable information (PII) and other sensitive information before the gameplay performance service processes it further. In some examples, the client devices may scrub the telemetry data prior to sending it to the gameplay performance service. The telemetry data that is provided to the gameplay performance service may comprise frame rate data and/or display resolution data, game identities that the frame rate data and/or display resolution data was associated with, and device configuration data associated with the client devices that executed the games. The device configuration data may comprise the GPU types of client devices providing the telemetry data, CPU types of client devices providing the telemetry data, and or combined GPU-CPU types of client devices providing the telemetry data. In examples, the gameplay performance service may determine GPU types based on reported GPU IDs, and CPU types based on reported CPU IDs. In additional examples, device configuration data may comprise random access memory (RAM) amount of client devices providing the telemetry data, and/or type of memory (e.g., hard disk drive, solid-state drive) of client devices providing the telemetry data. In other examples, device configuration data may comprise or take into account other metrics that impact the performance characteristics of gameplay (e.g., current GPU temperature, network bandwidth).

The gameplay performance service may determine frame rate values, such as average frames per second (FPS), for each of a plurality of different device configurations across one or more games that telemetry data is received for. Each device configuration may be associated with a performance metric (e.g., frame rate value). For example, devices of a first GPU type may be associated with an average frame rate of 30 FPS based on telemetry data received from a plurality of devices having that first GPU type executing a plurality of games accessed from the game library; devices of a second GPU type may be associated with an average frame rate of 60 FPS based on telemetry data received from a plurality of devices having that second GPU type executing a plurality of games accessed from the game library; and devices of a third GPU type may be associated with an average frame rate of 90 FPS based on telemetry data received from a plurality of devices having the third GPU type executing a plurality of games accessed from the game library. Performance metrics may be determined and stored for many different device configurations (e.g., tens, hundreds, thousands). Although performance metrics are generally described herein as corresponding to frame rate, device configurations may additionally be associated with other performance metrics (e.g., display resolution, lag data).

Once performance metrics have been determined for the different device configurations that are accessing games from the game library, the device configurations may be assigned to performance tiers. The performance tiers may correspond to performance metric thresholds (e.g., less than 20 FPS, between 20 FPS and 30 FPS, between 30 FPS and 40 FPS, more than 60 FPS) as determined from the telemetry data set comprised of each of the device configurations executing a plurality of games from the game library. The performance tiers may in some examples comprise performance targets (e.g., in order to hit a performance target of 30 FPS+ on a game you need a minimum of hardware tier X). In some examples, developers (e.g., developers associated with a gameplay performance service and/or gaming cloud service) may manually identify and set the different thresholds for the performance tiers and the device configurations may then be automatically assigned to their corresponding tiers according to the performance metrics determined for those device configurations based on analysis of the telemetry data. In other examples, one or more machine learning models may be utilized to assign device configurations to tiers. The one or more machine learning models may have been trained to classify device configurations into performance tiers utilizing frame rate values associated with device configurations. In some examples, the one or more machine learning models may comprise a neural network and/or one or more activation functions. In additional examples, the one or more machine learning models may comprise supervised or unsupervised clustering models.

The gameplay performance service and/or developers may determine and associate gameplay performance thresholds with each game included in the game library. For example, the gameplay performance service and/or developers may determine that a game needs to be played at a first minimum average frame rate for an acceptable gameplay experience, a second minimum average frame rate for a good gameplay experience, and a third minimum average frame rate for an excellent gameplay experience. These determinations may be made manually by developers, automatically by the gameplay performance service by processing gameplay telemetry data for each game, and/or based on user feedback manually provided back to the gameplay performance service by users that play each game. In some examples, the gameplay performance service may determine performance thresholds for a game by processing gameplay telemetry from a plurality of devices executing the game with one or more machine learning models that have been trained to classify gameplay into one or more experience categories (e.g., unacceptable gaming experience category, acceptable gaming experience category, good gaming experience category, excellent gaming experience category). In some examples, the one or more machine learning models may comprise a neural network. The neural network may receive and process frame rate data, game identity data, device configuration data, lag data, and/or time of connection data.

In some examples, the gameplay performance service may analyze gameplay performance telemetry data (e.g., frame rate data, display resolution data) for each specific game in association with the device configurations that generated that data. Based on that analysis, the gameplay performance service may determine which device configurations are needed to meet the determined gameplay performance thresholds for a game. The gameplay performance service may then identify performance tiers that meet each of the gameplay performance thresholds for a game and store that data in a database as performance fit data.

When a client device (e.g., PC, tablet) accesses the game library, a determination may be made as to the client device's device configuration (e.g., GPU type, CPU type, GPU-CPU combination type). The gameplay performance service may match the device's configuration to a performance tier. Based on the performance tier for the device, the gameplay performance service may modify user interface elements included in the game library. For example, the game library may filter out games that would not be a good fit for executing on the client device based on having a poor performance fit (e.g., performance thresholds for the game being higher than the performance tier of the client device configuration). In other examples, the game library may display suggestions to play games with poor performance fits via a cloud-based service that has more capable hardware than the accessing client device. In additional examples, the game library may display user interface elements that indicate that an accessing client device is a poor, acceptable, good, or excellent fit for executing one or more games based on performance fit. In still additional examples, if a user chooses to execute a game that is determined to be below a threshold performance fit for a client device, the client device may automatically reduce processing operations for one or more tasks other than execution of the game on the client device to free up processing resources for game execution. In some examples, automatically reducing processing operations for one or more tasks other than execution of the game on the client device may comprise turning off electronic notifications for one or more applications executed by the client device. In additional examples, automatically reducing processing operations for one or more tasks other than execution of the game on the client device may comprise pausing one or more background tasks being executed by the client device.

FIG. 1 is a schematic diagram illustrating an example distributed computing environment 100 for matching device configurations to games. Computing environment 100 includes client devices 102, cloud-based sub-environment 122, client device B 154 (e.g., client device B 154A and client device B 154B, which are the same computing device), and gameplay telemetry data 152.

Client devices 102 includes a plurality of client computing devices. In some examples the client computing devices may comprise personal computers (PCs). In other examples, the client computing devices may comprise tablets and/or smartphones. In additional examples, the client computing devices may comprise a combination of PCs, tablets, and/or smartphones. In this specific example, client devices 102 includes client device A 104, which includes a GPU of a first type (GPU A 106) and a CPU of a first type (CPU A 108); client device " . . . " 110 which includes a GPU of a second type (e.g., GPU " . . . " 112) and a CPU of a second type (CPU " . . . " 114); and client device N 116, which includes a GPU of a third type (GPU N 118) and a CPU of a second type (CPU N 120). Client devices 102 is representative of many different client computing devices (e.g., tens, hundreds, thousands, millions) that may access and locally execute a plurality of videogames (e.g., locally executed games 103) and provide telemetry data (e.g., gameplay telemetry data 152) to the gameplay performance service 130 based on that execution. As there are potentially hundreds, thousands, or even millions of client devices that provide gameplay telemetry data 152 to the gameplay performance service 130, some of client devices 102 may have same GPU types, different GPU types, same CPU types, and/or different CPU types. The gameplay telemetry data 152 sent from client devices 102 to the gameplay performance service 130 may comprise frame rate data for a plurality of games executed locally (e.g., locally executed games 103) by client devices 102. In additional examples, gameplay telemetry data 152 sent from client devices 102 to gameplay performance service 130 may comprise display resolution data for a plurality of games executed locally (e.g., locally executed games 103) by client devices 102.

Locally executed games 103 may be downloaded and/or installed locally on client devices 102. In some examples, locally executed games 103 may be downloaded from a game store or game library associated with gaming cloud service 150. Gaming cloud service 150 may host data associated with a plurality of games that may be downloaded to client devices 102. In additional examples, gaming cloud service 150 may be associated with one or more server computing devices that may execute games in the cloud that can be interacted with and rendered on client devices 102. That is, in some examples, a client device may interact with a game that is rendered and displayed locally, but that is primarily executed in the cloud via gaming cloud service 150.

Network and processing sub-environment 124 includes network 126 and server computing device 128. Any and all of the computing devices described herein may communicate with one another via a network, such as network 126. Server computing device 128 is illustrative of one or more server computing devices that may host and/or execute data described herein. For example, one or more server computing devices, such as server computing device 128, may execute games that may be rendered for display on client computing devices 102. In additional examples, one or more server computing devices, such as server computing device 128, may host and/or execute data associated with the gameplay performance service 130. For example, one or more server computing devices may host gameplay telemetry data store 144, game performance database 146, and/or hardware tier database 148. In additional examples, one or more server computing devices may execute data and/or operations associated with pre-ingestion transformation engine 132, performance fit engine 136, data ingestion engine 138, recommendation engine 140, and/or machine learning models 142.

According to some examples, server computing device 128 may perform operations associated with the gameplay performance service 130 for matching device configurations to games. Those operations may include determining a device configuration of a client device by analyzing a GPU ID of a GPU of the client device and/or determining a GPU type of the client device. The operations may further comprise determining a performance tier of the device configuration from a set of device configuration tiers generated from telemetry data from a plurality of client devices with different GPUs executing a plurality of games, wherein the telemetry data comprises frame rate data for each of the plurality of games executed by the plurality of client devices. The operations may further comprise accessing, by the client device, a software game library. The operations may further comprise identifying, from a subset of the telemetry data comprising telemetry data for a specific game included in the software game library, that the determined performance tier of the device configuration for the client device is associated with a minimum acceptable frame rate for the specific game. The operations may further comprise displaying an icon corresponding to the specific game on a display connected to the client device with an indication that the client device is a good fit for execution the specific game. The operation may further comprise identifying, from a second subset of the telemetry data comprising telemetry data for a second specific game included in the software game library, that the determined performance tier of the device configuration for the client device is associated with a frame rate that is below a minimum acceptable frame rate for the second specific game. The operations may further comprise displaying an icon corresponding to the second specific game on the display connected to the client device with a selectable user interface element for executing the second specific game by a server computing device.

Gameplay telemetry data 152 from a plurality of client computing devices with same and different device configurations (e.g., same and different GPUs, same and different CPUs) may be provided to and stored in gameplay telemetry data store 144. Pre-ingestion transformation engine 132 may process gameplay telemetry data 152. The processing of gameplay telemetry data 152 by pre-ingestion transformation engine 132 may comprise reformatting and/or transforming gameplay telemetry data 152 from gameplay telemetry data store 144 such that that the data is arranged in a more searchable and processable form. For example, pre-ingestion transformation engine 132 may reformat/transform gameplay telemetry data 152 in tabular or other schematic forms by device configurations (e.g., GPU type, CPU type) of the client devices that generated gameplay telemetry data 152, by game identity (e.g., which game was being executed by each client device), by frame rate, and/or by display resolution. In additional examples, pre-ingestion transformation engine 132 may sanitize/scrub gameplay telemetry data 152 of personal identifiable information (PII). In some examples, the sanitizing/scrubbing of gameplay telemetry data 152 may comprise processing gameplay telemetry data 152 with one or more machine learning models 142 that have been trained to automatically identify and delete personal identifying information.

Performance fit engine 136 may perform operations associated with processing the telemetry data that pre ingestion transformation engine 132 transformed to determine game performance thresholds for a plurality of games and hardware tiers for a plurality of device configurations. In determining/generating hardware tiers for a plurality of device configurations, performance fit engine 136 may assess the performance of different device configurations (e.g., different GPU types, different CPU types, different GPU-CPU type combinations) based on reported frame rate and/or display resolution for each device configuration for a plurality of games executed locally by client computing devices. In some examples, assessing the performance for a device configuration may comprise determining an average frame rate for one or more games executed locally by client devices having that device configuration and/or transforming frame rate data from local execution of the games to one or more secondary values via application of one or more algorithms or functions to generate confidence interval data that can be utilized in assessing performance fit of a device configuration. Using the resulting performance average for all device configurations, the device configurations may be ranked by performance (e.g., based on frame rate and/or display resolution). A plurality of performance groupings corresponding to the different device configurations may then be generated, where each performance grouping is associated with different performance thresholds (e.g., less than 30 FPS, between 30 FPS and 60 FPS, between 60 FPS and 90 FPS, over 90 FPS). Thus, each device configuration (e.g., GPU type, CPU type, GPU-CPU type combination) may be associated with a performance tier by performance fit engine 136. In some examples, the performance grouping data determined/generated by performance fit engine 136 may be stored in hardware tier database 148.

As described above, in addition to determining hardware tier configurations for a plurality of device configurations, performance fit engine 136 also determines game performance thresholds for a plurality of games. The game performance thresholds for the plurality of games may comprise device configuration tiers from the performance groupings that are required to play a game at one or more target frames per second (e.g., 30 FPS, 60 FPS, 90 FPS). Thus, performance fit engine 136 may identify which device configurations (e.g., GPU performance tiers, CPU performance tiers, GPU-CPU combination performance tiers) are capable of executing games a various average frame rates and/or display resolution metrics. In some examples, the game performance thresholds determined by performance fit engine 136 may be stored in game performance database 146.

Data ingestion engine 138 may perform operations for collating the hardware tier configuration data and game performance threshold data described above that was determined/generated by performance fit engine 136, and sending/publishing it to gaming cloud service 150 such that gaming cloud service 150 may generate recommendations for individual client devices, and specifically for client device configurations and games that those client devices may view or access via gaming applications (e.g., game application 160) in association with gaming cloud service 150.

A client device (e.g., client device B 154) may access a game library via a game application (e.g., game application 160) or service. Game application 160 may be installed locally on the client device or the game service may be accessed via a web browser installed on the client device. In examples, the game application 160 may be associated with gaming cloud service 150, and one or more resources or objects accessed or viewed via the game application 160 may be generated or hosted by gaming cloud service 150.

A client device (e.g., client device B 154) which is accessing a game library (e.g., via game application 160, via gaming cloud service 150) and/or the gameplay performance service 130 may identify a device configuration for the client device that is accessing the game library. In some examples, the device configuration may be determined based on a GUI ID and/or CPU ID of the accessing client device. A determination may then be made (e.g., by the accessing client device, by the gameplay performance service 130) as to a performance tier that the client device matches based on its device configuration and the device configuration tiers stored in hardware tier database 148. The device configuration of the client device may then be assigned or otherwise associated with the matched performance tier. In some examples, the matched performance tier may remain associated with the client device unless and until the device configuration for the client device changes (e.g., eGPU attach/detach, user component upgrade).

Based on the associated performance tier associated with a client device, recommendation engine 140 may display various recommendations in association with game icons in a game library that a client device is accessing. For example, if a client device is a good fit for a game based on the performance tier for the client device and the gaming performance thresholds for the game, recommendation engine 140 may indicate that the client device is a good fit for the game. Alternatively, if the client device is not a good fit for a game based on the performance tier for the client device and the gaming performance thresholds for the game, recommendation engine 140 may indicate that the client device is not a good fit for the game, filter the game from being displayed at all, move the game to a less prominent location in the game library, and/or indicate that the game would be better executed by a cloud-based game service than by the client device. According to some examples, if a determination is made that a determined performance tier for a client device/device configuration is associated with a frame rate that is below a threshold value for a game, and the game is nonetheless executed locally by the client device, the client device may automatically reduce processing operations for one or more tasks other than execution of the game on the client device. In some examples, reducing the processing operations for one or more tasks other than execution of the game on the client device may comprise turning off electronic notifications for one or more applications executed by the client device. In other examples, reducing the processing operations for one or more tasks other than execution of the game on the client device may comprise pausing one or more background tasks being executed by the client device. In this manner, processing resources for client devices that are on the fringe of performance thresholds for a game may be more fully devoted to executing the game such that an improved game playing experience may be realized.

As a specific example illustrated in FIG. 1, client device B 154 includes GPU B 156, CPU B 158, and game application 160. Client device B 154 accesses a game library associated with gaming cloud service 150 and/or gameplay performance service 130. A determination is made, based on one or both of the type of GPU B 156 and/or CPU B 158 as to a performance tier that client device B 154 matches. Game icons in the game library may be displayed via game application 160, as illustrated by game application canvas 162 on client device 154B. The game icons may be displayed in association with one or more recommendations, insights, or UI elements for initiated actions based on determining a fit of each game based on the performance tier of client device B 154 in relation to game performance thresholds for each game. Thus, in this example, game A 164 is displayed in association with performance recommendation 166, game " . . . " 168 is displayed in association with performance recommendation 170, and game N 172 is displayed in association with performance recommendation 174.

Figure 2:
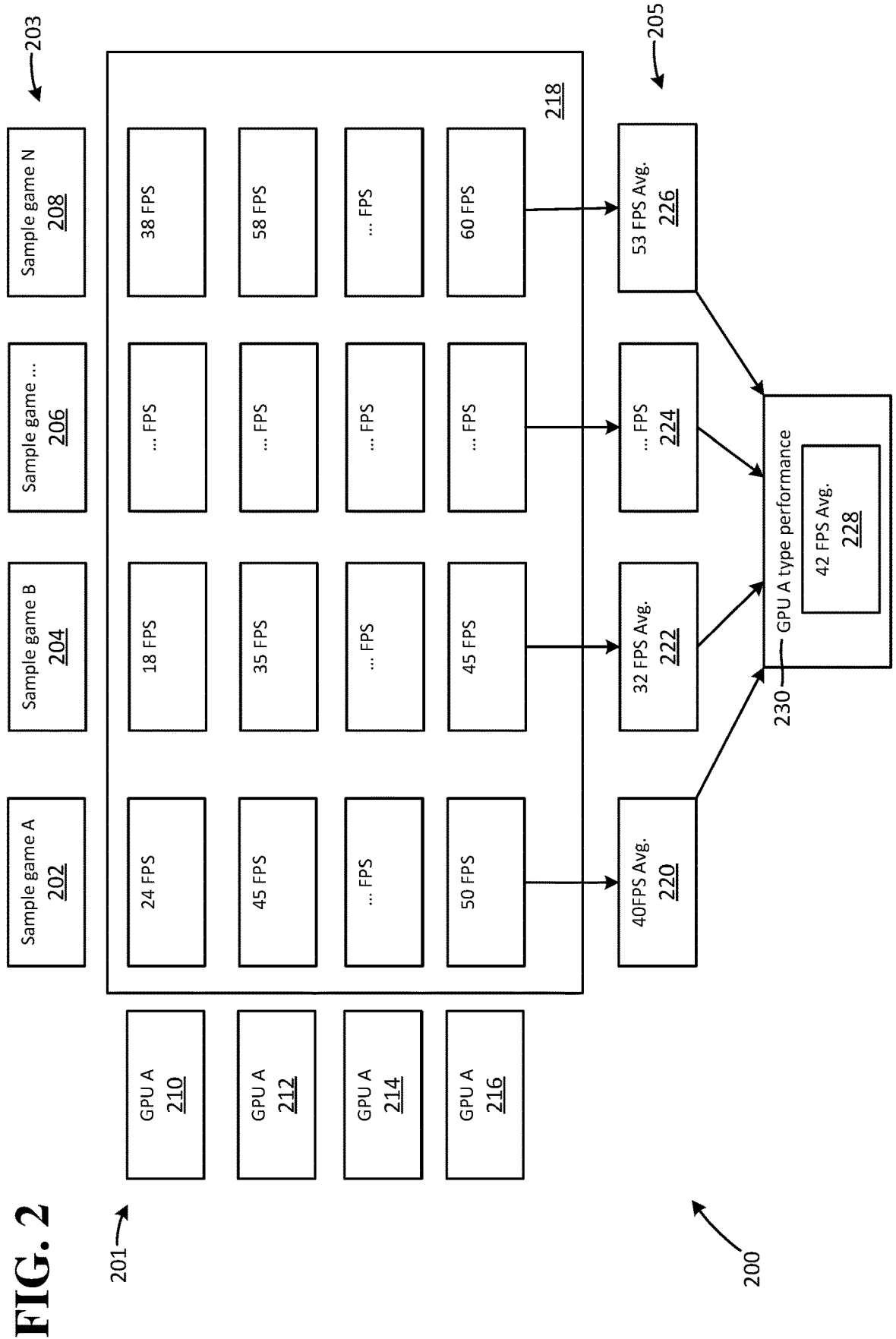
FIG. 2 is an exemplary block diagram illustrating the processing of gameplay telemetry data from client devices having a specific device configuration for use in determining hardware tiers for a plurality of device configurations.

FIG. 2 is an exemplary block diagram 200 illustrating the processing of gameplay telemetry data 218 from client devices having a specific device configuration for use in determining hardware tiers for a plurality of device configurations. In this example, the specific device configuration is a GPU of type A. Specifically, a plurality of client device (e.g., PCs, tablets) have been determined to have a type A GPU, and these devices/configurations are illustrated by device configurations 201 (e.g., GPU A 210, GPU A 212, GPU A 214, and GPU A 216). Each of the client devices corresponding to device configurations 201 have executed a plurality of games 203 (sample game A 202, sample game B 204, sample game " . . . " 206, sample game N 208), and gameplay telemetry data 218 from that game execution is provided to the gameplay performance service 130. In this example, the device configurations that are being associated with telemetry data only correspond to a GPU type. However, it should be understood that in other examples, the gameplay performance service 130 may associate telemetry data with a combined GPU-CPU configuration type. Additionally, in this example, the telemetry data 218 that is collected and analyzed by the gameplay performance service 130 includes frame rate data for a plurality of games executed by devices having GPU type A setups, however it should be understood that in other examples, telemetry data 218 may comprise one or more additional performance metrics (e.g., display resolution). In practice, the gameplay performance service 130 would collect and analyze gameplay telemetry data from a plurality of different device configurations (e.g., GPU A, GPU " . . . ", GPU N) that have executed a plurality of games. However, for ease of illustration only gameplay telemetry data for a single device configuration is illustrated and described in relation to FIG. 2.

Telemetry data 218 includes frame rate (e.g., frames per second) value data from execution of each of the plurality of games 203 that the device configurations 201 executed. In some examples, the frame rate value data may comprise an average frame rate. In other examples, the frame rate value data may comprise values generated by transforming frame rate data from local execution of games by the device configurations to one or more secondary values via application of one or more algorithms or functions. The transformed values may comprise confidence interval data that can be utilized in assessing the gameplay performance for a specific device configuration.

Once the telemetry data 218 is received, the gameplay performance service 130 may combine the values from execution of each game, as illustrated by combined FPS values 205. In this specific example, combining the values for each game from the multiple client devices comprises calculating an average frame rate for each game from all of the client devices that executed each game. Thus, in this example, the data under sample game A 202 is averaged to game A average FPS value 220 (e.g., 40 FPS), the data under sample game B 204 is averaged to game B average FPS value 222 (e.g., 32 FPS), the data under sample game " . . . " 206 is averaged to game " . . . " average FPS value 224 (e.g., " . . . " FPS), and the data under sample game N 208 is averaged to game N average FPS value 226. Those values are then combined to determine a performance metric for the specific device configuration (e.g., GPU type A). This is illustrated by GPU A type performance object 230, which is associated with the determined performance metric 228. The determined performance metric 228 for the GPU type A device configuration in this example is 42 FPS. As described above, the gameplay performance service 130 processes data from a variety of device configurations, and as such, a unique performance metric would be determined for each of those device configurations (although it is possible that two or more different device configurations could have a same or similar performance metric).

Although in this example the performance metric for the device configuration is calculated by combining average frame rates, it should be understood that other functions or algorithms may be applied to the telemetry data 218 in determining a performance metric for a device configuration group.

Figure 3:
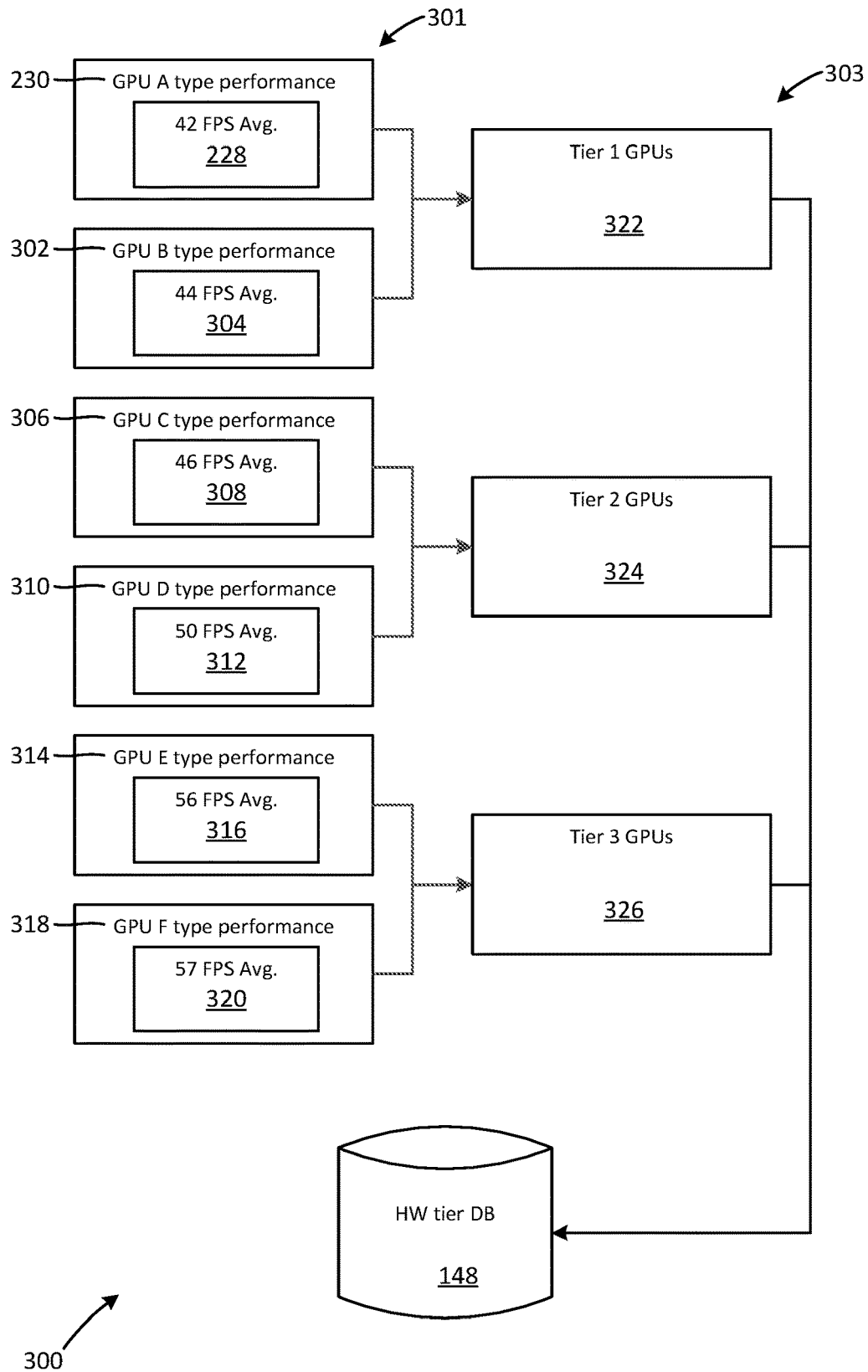
FIG. 3 is an exemplary block diagram illustrating the grouping of performance metrics for different device configurations into performance tiers.

FIG. 3 is an exemplary block diagram 300 illustrating the grouping of performance metrics 301 for different device configurations into performance tiers 303. The performance metrics 301 in this example include a plurality of different performance metrics, where each performance metric is associated with a different device configuration. Each of performance metrics 301 may be determined via same or similar operations as those discussed in relation to FIG. 2.

Performance metrics 301 includes GPU A type performance object 230, which is associated with determined performance metric 228 (e.g., 42 average FPS for GPUs of type A); GPU B type performance object 302, which is associated with determined performance metric 304 (e.g., 44 average FPS for GPUs of type B); GPU C type performance object 306, which is associated with determined performance metric 308 (e.g., 46 average FPS for GPUs of type C); GPU D type performance object 310, which is associated with determined performance metric 312 (e.g., 50 average FPS for GPUs of type D); GPU E type performance object 314, which is associated with determined performance metric 316 (e.g., 56 average FPS for GPUs of type E); GPU F type performance object 318, which is associated with determined performance metric 320 (e.g., 57 average FPS for GPUs of type F).

Each of the performance objects and performance metrics 301 may be determined and/or stored by the gameplay performance service 130. In some examples, the gameplay performance service 130 may automatically group different device configurations into tiered groups, where each group is associated with different and/or threshold frame rate data (e.g., average frame rate for each of a plurality of games). In some examples, the gameplay performance service 130 may group different device configurations into tiered groups utilizing one or more machine learning models (e.g., machine learning models 142) that have been trained to classify device configurations into performance tiers utilizing frame rate values associated with device configurations. In some examples, the one or more machine learning models may comprise a neural network and/or one or more activation functions. In additional examples, the one or more machine learning models may comprise supervised or unsupervised clustering models. In additional examples, developers may determine frame rate thresholds for one or more tiers, and each of the device configurations corresponding to the performance metrics 301 may be automatically or manually associated with corresponding tiers.

In this example, device configurations including GPUs of type A and B (corresponding to GPU A type performance object 230 and GPU B type performance object 302) are associated or otherwise grouped into first performance tier 322. Device configurations including GPUs of type C and D (corresponding to GPU C type performance object 306 and GPU D type performance object 310) are associate or otherwise grouped into second performance tier 324. Device configurations including GPUs of type E and F (corresponding to GPU E type performance object 314 and GPU F type performance object 318) are associated or otherwise grouped into third performance tier 326. The device configurations and their associations/groupings with performance tiers may be stored in a database, such as hardware tier database 148.

Figure 4:
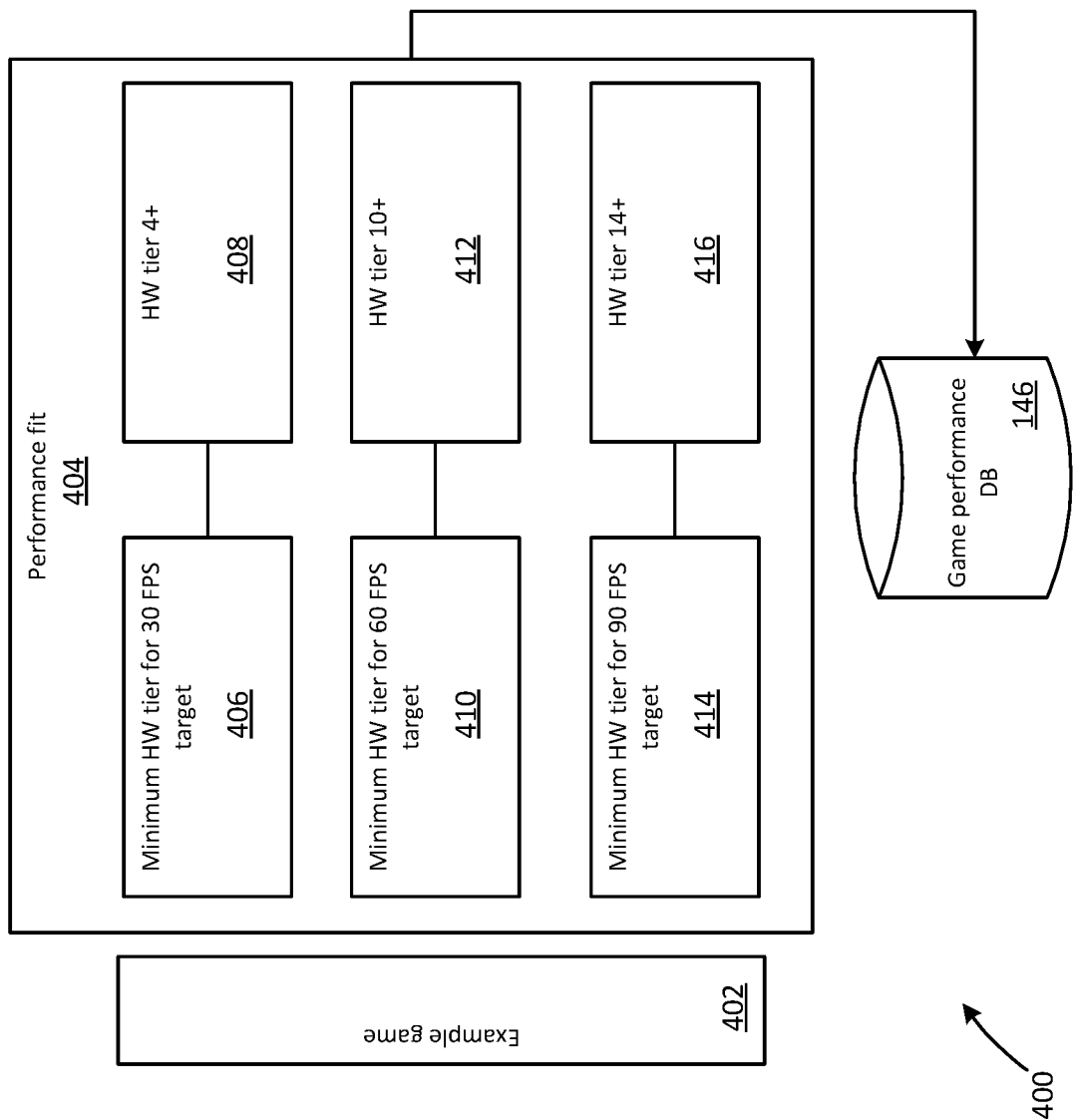
FIG. 4 is an exemplary block diagram illustrating the association of performance tiers with performance thresholds for a game, and the storage of those performance thresholds in association with the game.

FIG. 4 is an exemplary block diagram 400 illustrating the association of performance tiers (408, 412, 416) with performance thresholds (406, 410, 414) for a game 402, and the storage of those performance thresholds in association with the game. The performance tiers in this example may include one or more device configurations (e.g., GPU types, CPU types, GPU-CPU combination types).

The gameplay performance service 130 may associate games (e.g., example game 402) included in its game store/library with performance tiers and performance thresholds. For example, a determination may be made that a game (e.g., example game 402) needs to be played at a minimum of 30 FPS for an acceptable user experience to be had, the game needs to be played at a minimum of 60 FPS for a good user experience to be had, and the game needs to be played a minimum of 90 FPS for an excellent user experience to be had. These determinations may be made manually by developers, based on analyzing telemetry data from users that play the game (e.g., example game 402), and/or based on user feedback manually provided back to the gameplay performance service 130 by users that play the game.

Upon determining the minimum frame rate thresholds associated with acceptable/unacceptable gameplay thresholds, the gameplay performance service 130 may determine from the performance tiers (e.g., performance tiers included in hardware tier database 148 and discussed in relation to FIG. 2) which device configurations meet the different FPS thresholds associated with acceptable/unacceptable gameplay thresholds. In this example, the gameplay performance service 130 determines that for a first gameplay threshold 406 (e.g., minimum hardware tier for 30 FPS target) that client devices must have device configurations that are associated with a fourth hardware tier 408 or higher. The gameplay performance service 130 determines that for a second gameplay threshold 410 (e.g., minimum hardware tier for 60 FPS target) that client devices must have device configurations that are associated with a tenth hardware tier 412 or higher. The gameplay performance service 130 determines that for a third gameplay threshold 414 (e.g., minimum hardware tier for 90 FPS target) that client devices must have device configurations that are associated with a fourteenth hardware tier 416 or higher.

Although in this example three different gameplay thresholds are illustrated and described, it should be understood that there may be more or fewer gameplay thresholds associated with a game. For example, a game may simply have a single minimum gameplay threshold associated with it, and therefore a single minimum performance tier associated with it. As another example, a game may have four, five, or more gameplay thresholds associated with it, and a corresponding number of performance tiers associated with it and those gameplay thresholds. The gameplay performance service 130 may store performance thresholds and corresponding performance tiers associated with each game as performance fit data 404 in its library/store in a database, such as game performance database 146.

In some examples, the gameplay performance service 130 may determine which performance tiers are needed to meet gameplay thresholds based on analyzing telemetry data for one or more performance tiers and the game in question (e.g., example game 402). For example, the gameplay performance service 130 may analyze telemetry data from devices in performance tiers 3 and below for example game 402 and determine that they experience a frame rate of less than 30 FPS for example game 402. The gameplay service 130 may analyze telemetry data from devices in performance tiers 4 and up for example game 402 and determine that they experience a frame rate of more than 30 FPS for example game 402. The game play service 130 may analyze telemetry data from devices in performance tiers 9 and below for example game 402 and determine that they experience a frame rate of less than 60 FPS for example game 402. The gameplay service 130 may analyze telemetry data from devices in performance tiers 10 and up for example game 402 and determine that they experience a frame rate of more than 60 FPS for example game 402. The gameplay service 130 may analyze telemetry data from devices in performance tiers 13 and below for example game 402 and determine they experience a frame rate of less than 90 FPS for example game 402. The gameplay service 130 may analyze telemetry data from devices in performance tiers 14 and up for example game 402 and determine they experience a frame rate of more than 90 FPS for example game 402.

The gameplay performance service 130 may analyze telemetry data from devices in various performance tiers for each game included in a game library/store associated with gaming cloud service 150. Therefore, the gameplay service 130 may associate each game in the game library/store with performance fit data (e.g., gameplay thresholds and corresponding hardware tiers for meeting those thresholds). The performance fit data (e.g., performance fit data 404) for each game may be stored in a database, such as game performance database 146.

Figure 5:
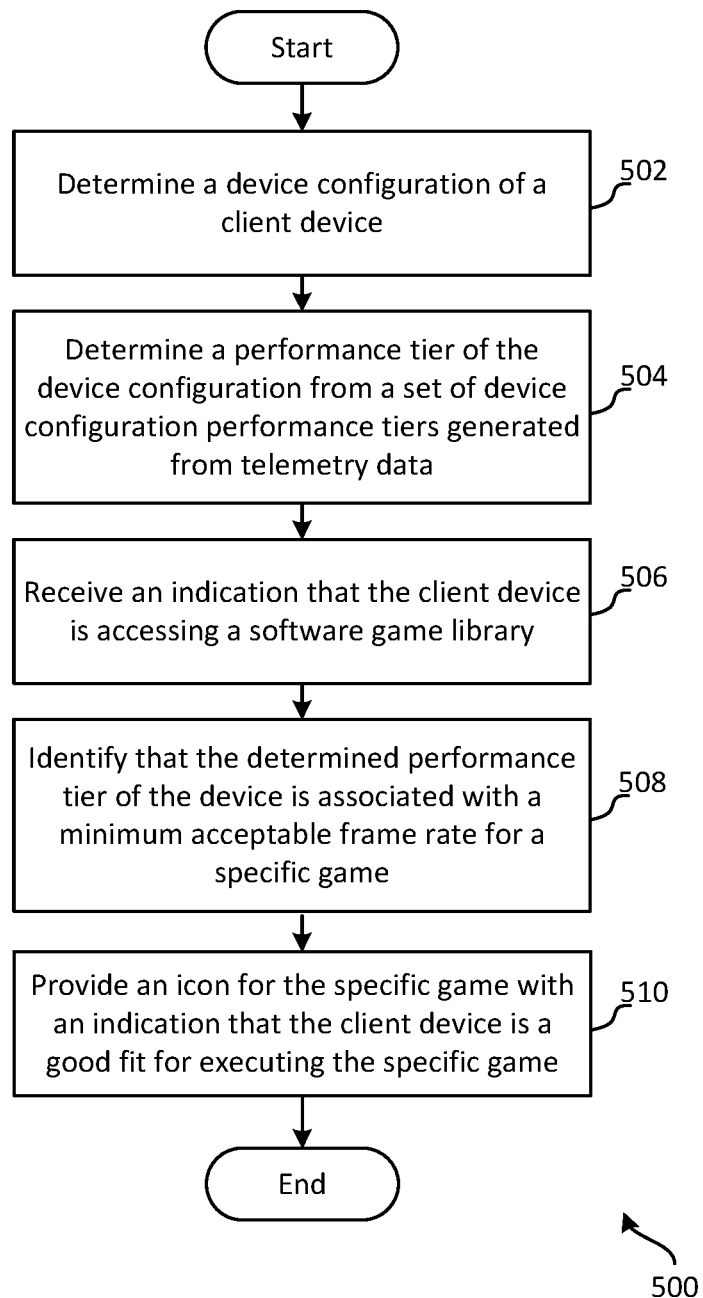
FIG. 5 is an exemplary method for matching device configurations to games.

FIG. 5 is an exemplary method 500 for matching device configurations to games. The method 500 begins at a start operation and flow moves to operation 502.

At operation 502 a device configuration of a client device is determined. For example, the device configuration may be determined based on analyzing a GPU ID of a GPU of a client device. In some examples, the device configuration of the client device may be determined by determining the GPU type and/or CPU type of the client device. For example, the gameplay performance service 130 may determine the device configuration in response to the client device accessing a gaming cloud service 150. In some embodiments, the client device determines the device configuration.

From operation 502 flow continues to operation 504 where a determination is made as to a performance tier of the device configuration. The performance tier is selected from device configuration performance tiers generated from telemetry data from a plurality of client devices with different GPUs executing a plurality of games. For example, the telemetry data may include frame rate data for each of the plurality of games executed by the plurality of client devices. As an example, the game performance service 130 may process gameplay telemetry data from many different client devices comprised of a plurality of device configurations (e.g., same and different GPUs, same and different CPUs) executing one or more games. The game performance service 130 may then determine from the gameplay telemetry data that each device configuration is associated with a unique frame rate value (e.g., average frame rate, frame rate confidence metric) for the one or more games the telemetry data was reported for. The game performance service 130 and/or developers associated with the game performance service 130 may associate one or more device configurations into performance tiers based on their frame rate values. As such, the GPU type for the client device may be matched to a performance tier at operation 504.

From operation 504 flow continues to operation 506 where an indication is received that a software game library is accessed by the client device. The software game library may comprise identities of a plurality of videogames. The software game library may be stored on the client device, stored in the cloud, or partially stored on the client device and partially stored in the cloud. The software game library may comprise the identity of a plurality of games and associated data. The identities of the plurality of games or associated user interface elements in a game application or service utilized to access the software game library may be interacted with to download and/or play/execute each corresponding game on the client device. In some examples, one or more games included in the library may be associated with a selectable element for executing the game in the cloud and rendering the game on the client device.

From operation 506 flow continues to operation 508 where an identification is made, from a subset of the telemetry data comprising telemetry data for a specific game included in the software game library, that the determined performance tier of the device configuration for the client device is associated with a minimum acceptable frame rate for the specific game. One or more games in the software library may be automatically or manually associated with one or more minimum frame rate thresholds corresponding to acceptable or unacceptable gaming experiences. For example, a first minimum frame rate threshold may correspond to an acceptable gaming experience for a game, a second minimum frame rate may correspond to a good gaming experience for the game, and a third minimum frame rate may correspond to an excellent gaming experience for the game. The minimum acceptable frame rates for a game may be stored in a database, such as game performance database 146 and matched to a performance tier determined for a client device accessing a game. The performance tiers may be stored in a database, such as hardware tier database 148. The specific game may be, for example, a game selected for play on the client device.

From operation 508 flow continues to operation 510 where an icon corresponding to the specific game is provided for display on a display connected to the client device with an indication that the client device is a good fit for execution of the specific game. The indication may demonstrate to a user that the user will have a good gameplay experience on the client device the user is accessing the game on. For example, the gameplay performance service 130 may generate the icon with the indication and transmit the icon and indication to the client device for display to the user. In examples where a determination is made that a client device and its device configuration are associated with a performance tier that does not meet the minimum acceptable frame rate for a game, the gameplay performance service 130 and/or the client device may indicate (e.g., with a user interface element, via audio output) that the client device is not a good fit for execution of the specific game. In additional examples, if a determination is made that a client device and its configuration are associated with a performance tier that does not meet the minimum acceptable frame rate for a game, the gameplay performance service may perform one or more other operations. The one or more other operations may comprise causing a selectable recommendation to have the game executed in the cloud and rendered on the client device displayed or otherwise surfaced. The recommendation may be selectable for automatically launching the game and executing it in the cloud and causing the game to be rendered on a display of the client device. In additional examples, if a client device is associated with a lower performance tier than is necessary to have an acceptable gaming experience for a game, and the game is nonetheless executed by the client device, the gameplay performance service and/or the client device may automatically reduce processing operations for one or more tasks on the client device other than execution of the game on the client device. In some examples, automatically reducing processing operations for one or more tasks other than execution of the game on the client device may comprise turning off electronic notifications for one or more applications executed by the client device. In additional examples, automatically reducing processing operations for one or more tasks other than execution of the game on the client device may comprise pausing one or more background tasks being executed by the client device.

From operation 510 flow moves to an end operation and the method 500 ends.

Figure 6:
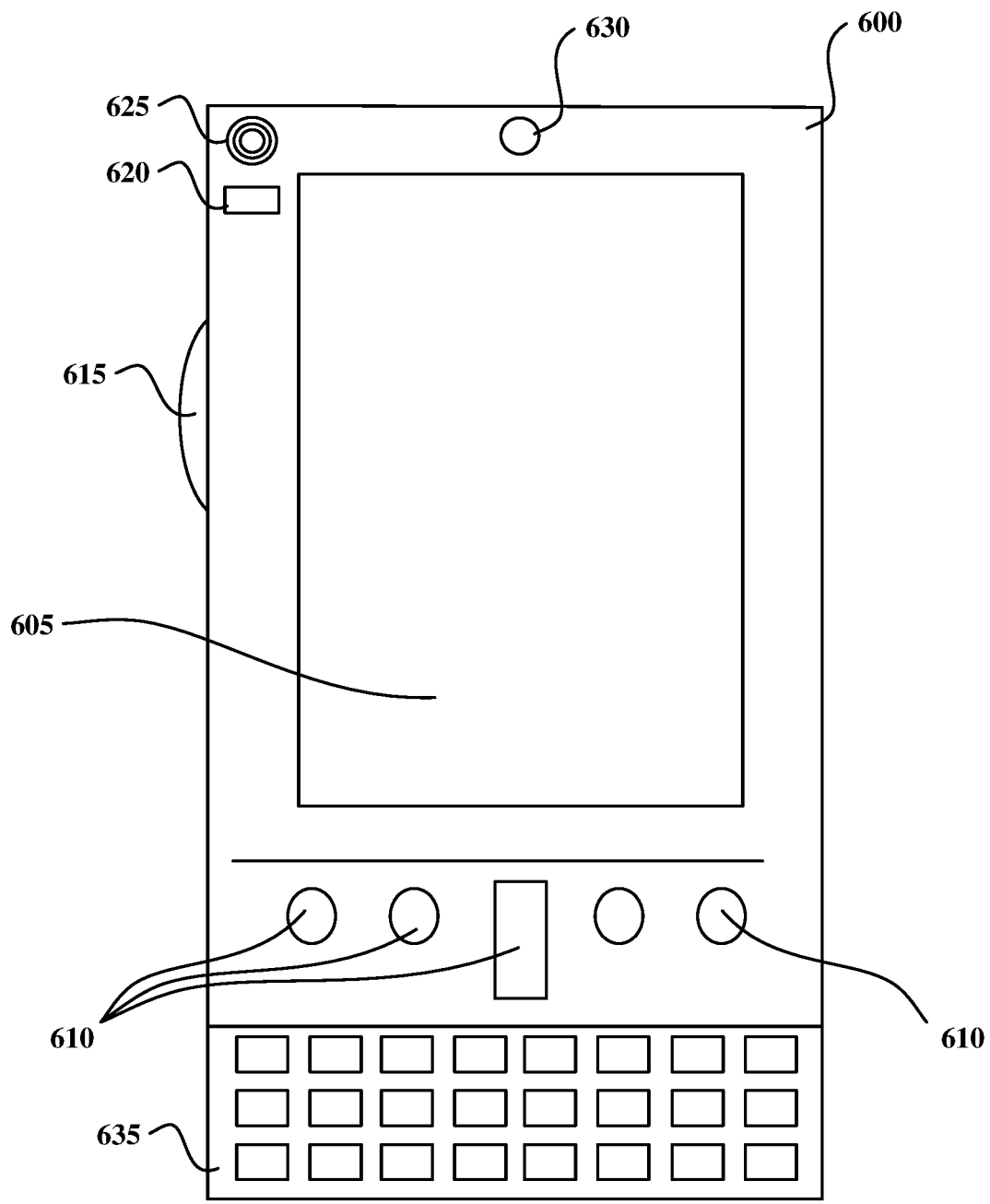
FIGS. 6 and 7 are simplified diagrams of a mobile computing device with which aspects of the disclosure may be practiced.
Figure 7:
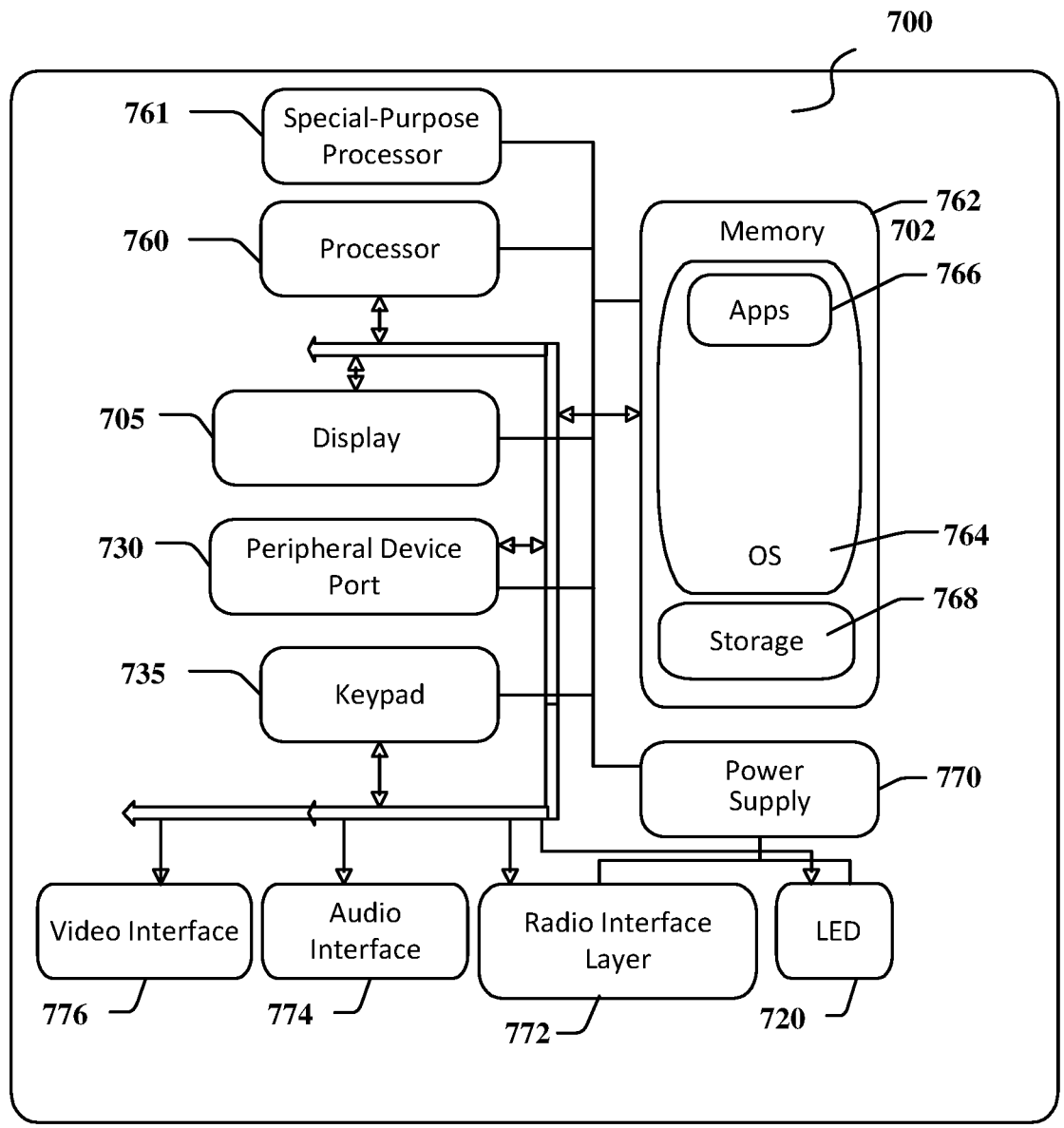

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant clustering computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
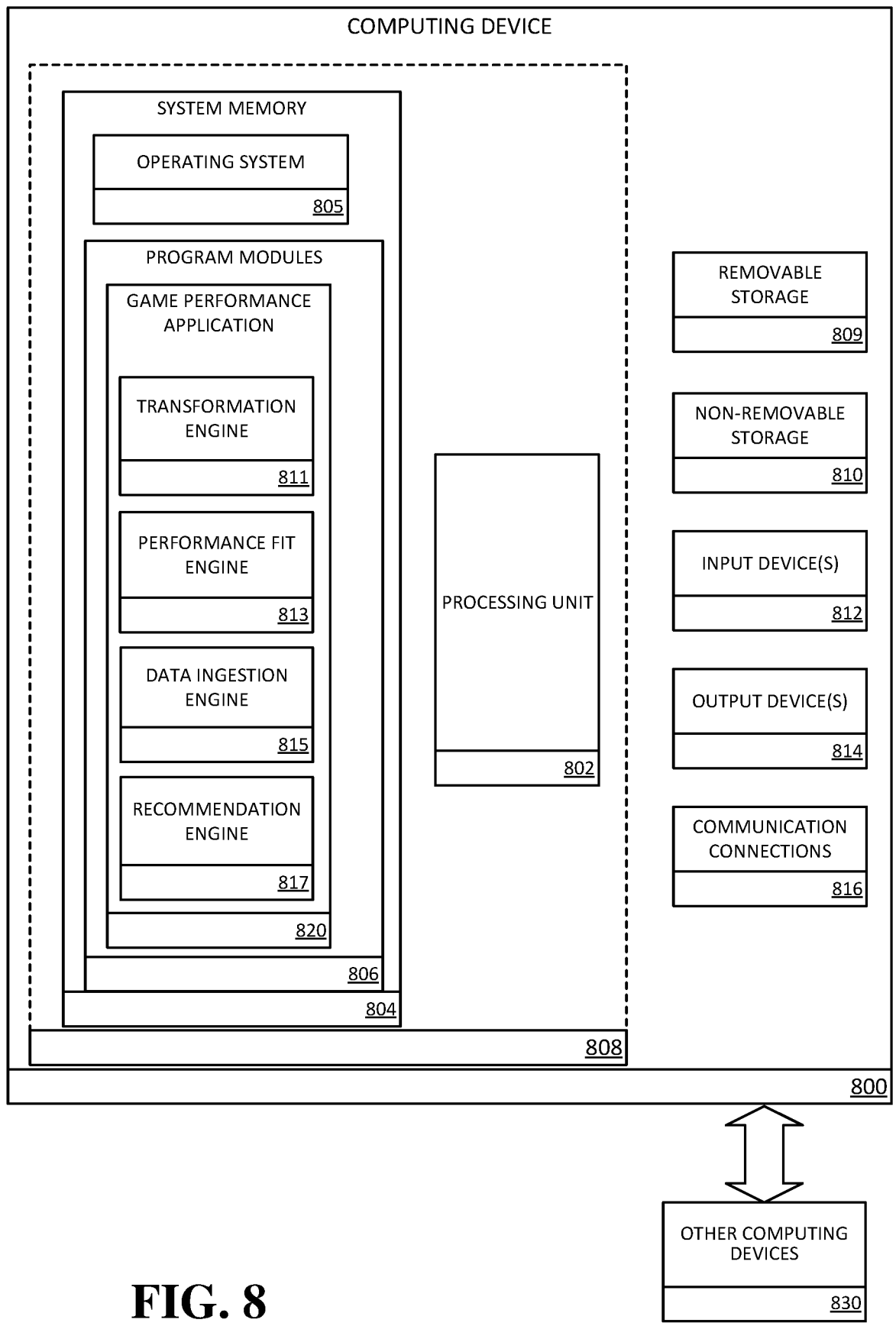
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for matching device configurations to games. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running facial recognition and device authorization programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., game performance application 820) may perform processes including, but not limited to, the aspects, as described herein. Shared object application 820 may include a transformation engine 811, a performance fit engine 813, a data ingestion engine 815, and/or a recommendation engine 817.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 830. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include transitory media such as a carrier wave or other propagated or modulated data signal. Computer storage device does not include transitory media such as a carrier wave or other propagated or modulate data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
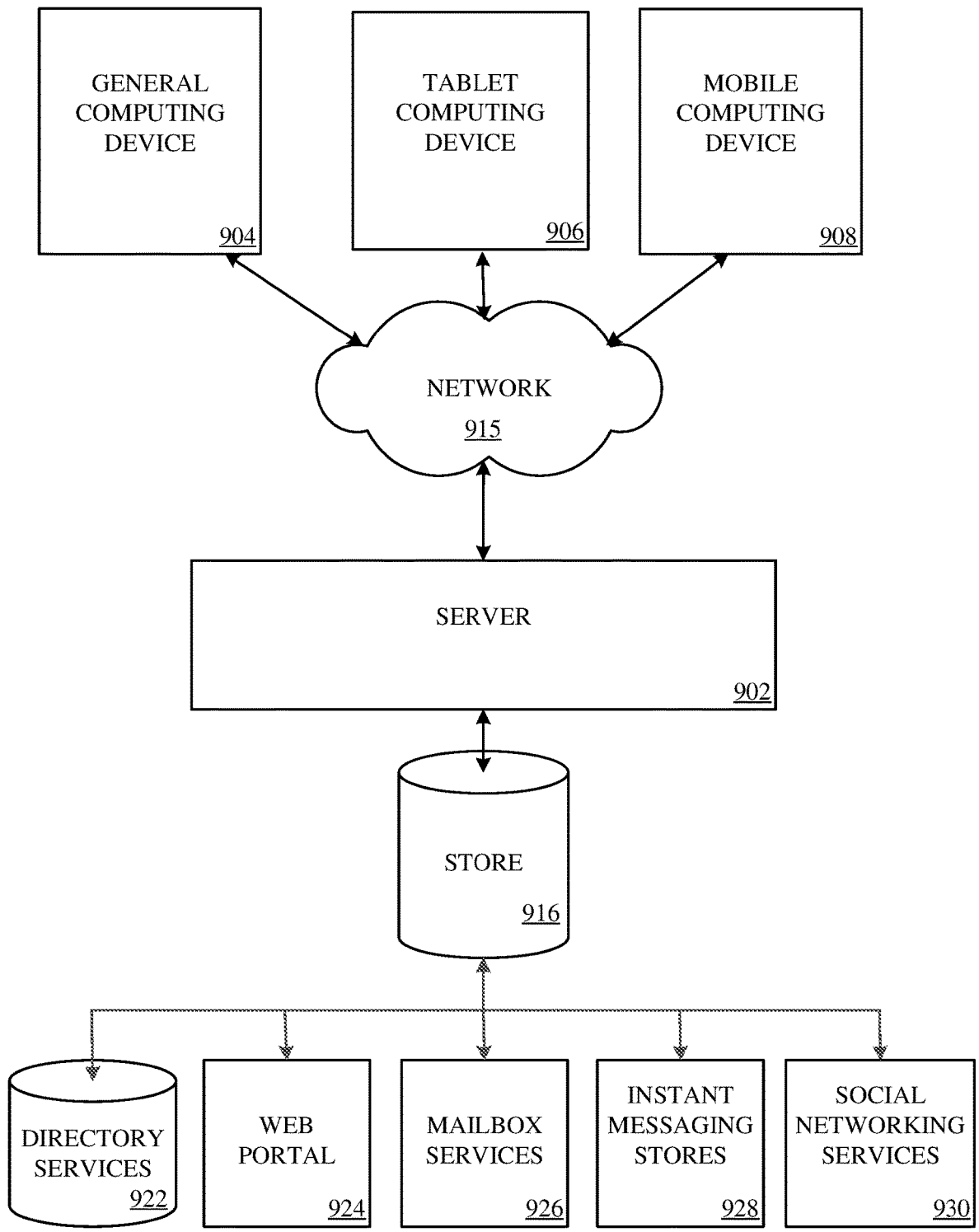
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for matching device configurations to games, the computer-implemented method comprising:
    determining a device configuration of a client device, the determining comprising analyzing a graphics processing unit (GPU) ID of a GPU of the client device;
    determining a performance tier of the device configuration from a set of device configuration performance tiers generated from telemetry data from a plurality of client devices with different GPUs executing a plurality of games, wherein the telemetry data comprises frame rate data for each of the plurality of games executed by the plurality of client devices;
    receiving an indication that the client device is accessing a software game library;
    identifying, from a subset of the telemetry data comprising telemetry data for a specific game included in the software game library, that the determined performance tier of the device configuration for the client device is associated with a frame rate that is below a minimum acceptable frame rate for the specific game; and
    providing, for display on a display device connected to the client device, an icon corresponding to the specific game and an indication that the client device is not a good fit for executing the specific game.

2. The computer-implemented method of claim 1, wherein the telemetry data further comprises display resolution data for each of the plurality of games executed by the plurality of client devices.

3. The computer-implemented method of claim 1, wherein the plurality of client devices that generated the telemetry data are classified into device configuration groups based on GPU IDs and central processing unit (CPU) IDs.

4. The computer-implemented method of claim 1, further comprising:
    identifying, from a second subset of the telemetry data comprising telemetry data for a second specific game included in the software game library, that the determined performance tier of the device configuration for the client device is associated with a minimum acceptable frame rate for the second specific game; and
    providing, for display on the display device, a second icon corresponding to the second specific game and an indication that the client device is a good fit for executing the specific game.

5. The computer-implemented method of claim 1, further comprising:
    in response to the client device executing the specific game, automatically reducing processing operations for one or more tasks other than execution of the specific game on the client device.

6. The computer-implemented method of claim 5, wherein automatically reducing processing operations for one or more tasks other than execution of the specific game on the client device comprises turning off electronic notifications for one or more applications executed by the client device.

7. The computer-implemented method of claim 5, wherein automatically reducing processing operations for one or more tasks other than execution of the specific game on the client device comprises pausing one or more background tasks being executed by the client device.

8. The computer-implemented method of claim 1, further comprising:
    moving, for display on the display device, the specific game to a lower position in the software game library.

9. The computer-implemented method of claim 1, wherein generating the set of device configuration performance tiers comprises processing the telemetry data with one or more machine learning models that have been trained to classify device configurations into performance tiers.

10. The computer-implemented method of claim 9, wherein the one or more machine learning models comprise a neural network and an activation function.

11. The computer-implemented method of claim 10, further comprising:
    determining that a frame rate of the specific game on the client device is below a threshold value; and
    providing negative feedback to the neural network, wherein providing the negative feedback comprises training the neural network using back propagation.

12. The computer-implemented method of claim 10, further comprising:
    determining that a frame rate of the specific game on the client device is above a threshold value; and
    providing positive feedback to the neural network, wherein providing the positive feedback comprises training the neural network using back propagation.

13. The computer-implemented method of claim 1, wherein in generating the set of device configuration performance tiers, the telemetry data is processed with one or more machine learning models that have been trained to automatically remove personal identifying information.

14. A computer-implemented method for matching device configurations to games, the computer-implemented method comprising:
   determining a device configuration of a client device, the determining comprising analyzing a graphics processing unit (GPU) ID of a GPU of the client device;
   determining a performance tier of the device configuration from a set of device configuration performance tiers generated from telemetry data from a plurality of client devices with different GPUs executing a plurality of games, wherein the telemetry data comprises frame rate data for each of the plurality of games executed by the plurality of client devices;
   receiving an indication that the client device is accessing a software game library;
   identifying, from a subset of the telemetry data comprising telemetry data for a specific game included in the software game library, that the determined performance tier of the device configuration for the client device is associated with a frame rate that is below a minimum acceptable frame rate for the specific game; and
   providing, for display on a display device connected to the client device, an icon corresponding to the specific game and a selectable user interface element for executing the specific game by a server computing device.

15. The computer-implemented method of claim 14, wherein the telemetry data further comprises display resolution data for each of the plurality of games executed by the plurality of client devices.

16. The computer-implemented method of claim 14, wherein the plurality of client devices that generated the telemetry data are classified into device configuration groups based on GPU IDs and central processing unit (CPU) IDs.

17. The computer-implemented method of claim 14, further comprising:
   identifying, from a second subset of the telemetry data comprising telemetry data for a second specific game included in the software game library, that the determined performance tier of the device configuration for the client device is associated with a minimum acceptable frame rate for the second specific game; and
   providing, for display on the display device, a second icon corresponding to the second specific game and an indication that the client device is a good fit for executing the specific game.

18. The computer-implemented method of claim 14, further comprising:
   in response to the client device executing the specific game, automatically reducing processing operations for one or more tasks other than execution of the specific game on the client device, wherein automatically reducing processing operations comprises one or more of turning off electronic notifications for one or more applications executed by the client device and pausing one or more background tasks being executed by the client device.

19. The computer-implemented method of claim 14, wherein generating the set of device configuration performance tiers comprises processing the telemetry data with one or more machine learning models that have been trained to classify device configurations into performance tiers.

20. A system for matching device configurations to games, comprising:
   a memory for storing executable program code; and
   a processor, functionally coupled to the memory, the processor being responsive to computer-executable instructions contained in the executable program code and operative to:
      determine a device configuration of a client device, the determining comprising analyzing a graphics processing unit (GPU) ID of a GPU of the client device;
      determine a performance tier of the device configuration from a set of device configuration performance tiers generated from telemetry data from a plurality of client devices with different GPUs executing a plurality of games, wherein the telemetry data comprises frame rate data for each of the plurality of games executed by the plurality of client devices;
      receive an indication that the client device is accessing a software game library;
      identify, from a subset of the telemetry data comprising telemetry data for a specific game included in the software game library, that the determined performance tier of the device configuration for the client device is associated with a frame rate that is below a minimum acceptable frame rate for the specific game; and
      provide, for display on a display device connected to the client device, an icon corresponding to the specific game and an indication that the client device is not a good fit for executing the specific game.

* * * * *